United States Patent [19]
Cole

[11] Patent Number: 5,598,171
[45] Date of Patent: *Jan. 28, 1997

[54] VELOCITY DETECTING SYSTEM

[76] Inventor: Carroll R. Cole, 2313 Ramsey Dr., Decatur, Ill. 62526

[ * ] Notice: The term of this patent shall not extend beyond the expiration date of Pat. No. 5,451,970.

[21] Appl. No.: 459,752

[22] Filed: Jun. 2, 1995

Related U.S. Application Data

[62] Division of Ser. No. 277,187, Jul. 19, 1994.

[51] Int. Cl.⁶ .............................. H01Q 1/06; H01Q 13/00
[52] U.S. Cl. ...................... 343/721; 343/711; 343/773; 343/786
[58] Field of Search .................................. 343/711, 713, 343/720, 721, 772, 773, 786, 789; 342/165; 362/253, 254, 257; H01Q 1/06

[56] References Cited

U.S. PATENT DOCUMENTS

| | | | |
|---|---|---|---|
| 3,683,379 | 8/1972 | Saddler et al. | 343/721 |
| 3,878,506 | 4/1975 | Young | 343/721 |
| 5,313,213 | 5/1994 | Neumann et al. | 343/721 |
| 5,446,470 | 8/1995 | Avignon et al. | 343/713 |
| 5,451,970 | 9/1995 | Cole | 343/721 |

FOREIGN PATENT DOCUMENTS 0030103  2/1986  Japan .................. H01Q 3/04

*Primary Examiner*—Donald T. Hajec
*Assistant Examiner*—Tan Ho
*Attorney, Agent, or Firm*—Wood, Phillips, VanSanten, Clark & Mortimer

[57] ABSTRACT

A velocity detecting radar unit that is easy to operate and to view so as to minimize distraction to the operator, particularly when in use in a moving vehicles includes a spotlight unit having a housing with a lens, a light source within the housing and a control wand pivotally mounting the housing for rotation about an axis and including an elongated tube adapted to extend through the windshield pillar of a vehicle. A radar antenna is mounted in the housing to be movable therewith and has a radar transmitting and receiving end extending from the housing oppositely of the spotlight lens. A display module is adapted to display velocity data and other information and is adjustable mounted to the tube at a location thereon remote from the spotlight housing. Similarly, an input or control module including function switches for providing function commands to a controller for the unit is provided and is adjustable mounted to the tube at a location thereon remote from the housing.

2 Claims, 3 Drawing Sheets

VELOCITY DETECTING SYSTEM

This is a division of application Ser. No. 08/277,187 filed Jul. 19, 1994.

FIELD OF THE INVENTION

This invention relates to a velocity detecting system such as a mobile radar velocity detecting system.

BACKGROUND OF THE INVENTION

Velocity detecting systems have long been used to detect or track the velocity of moving objects such as vehicles in traffic. Modern day systems can be operated from, for example, a patrol vehicle such as a police vehicle, whether the same is parked or is in motion on patrol. They may be used to detect the velocity of oncoming vehicles or the velocity of vehicles moving in the same direction as the patrol vehicle.

Conventionally, such units provide displays that display the speed of the patrol vehicle and the speed of the target. Additionally, some include a third display which is a "lock" or "hold" display locked on the previously detected speed of some particular vehicle. In addition, other indications are given to the operators such as whether an undesirable low voltage system exist, whether the system is in a "hold" mode, whether the power to the unit is on, etc.

Such systems also include some sort of means for providing manual command and other functions. For example, the system must include an adjustable audio output and volume control that is correlated with the received Doppler signal.

It is also necessary to provide a command that the "hold" feature of the system is to be used.

In some units, the operator has the choice of using a front facing antenna or a rear facing antenna, and information must be given as to which antenna should be taken.

Typically, such systems provide a squelch adjustment, and are also equipped with a means to advise the system whether it is being operated in the stationary mode or in a moving mode.

As can be imagined from the foregoing, when the system is being utilized in the moving mode, in addition to operating the vehicle in which the system is used, as well as visually determining which of possibly several vehicles has been targeted, considerable attention must be paid by the operator to the display and to the input commands. In current systems, some or all of the displays as well as some or all of the switches that are utilized to provide input information are mounted in the back of the antenna or processing unit which in turn is mounted or set on the dash of the vehicle. Typically, the unit or portions thereof are mounted generally centrally of the dash so that it will not obstruct the operator's forward view of the road.

A hand held remote control is sometimes used to provide some limited control of the radar processor or antenna unit. It may be attached by a cable to the processing unit or it may be a wireless infrared type device. This portion of a radar operating system, depending on the design, may be misplaced, lost or fall on the vehicle floor due to rapid maneuvering. As there is no set location for this portion of the radar system, it becomes subject to contamination and damage as described.

All too typically, when operating the radar, it requires the operator to take his eyes off the road to set the various switches and controls, or perhaps look for a hand operated remote control, and turn his head to view the radar speed display unit, giving rise to the potential loss of control of the vehicle as a result of the operator's attention being directed to operating the radar unit.

Furthermore, many such units are removably mounted on the dash or its vicinity as they are intended to be usable in a hand held mode whereat the operator will simply point the antenna in the direction of any desired target. While the hand held feature is desirable from the standpoint of flexibility of operation of the system, it is undesirable from a safety standpoint. Specifically, typical radars are "add on devices" not fixedly attached to the vehicle and in the event the vehicle is involved in a collision abrupt maneuvering or the like, the unit or units as described may break free from their mountings on the dash (which may be designed to allow relatively easy release for hand held operation), and may then become flying objects in the interior of the patrol vehicle.

Government mandates prevent the location of any device that would potentially reduce the effectiveness of deploying air bags. Police vehicles are currently in operation with potentially unsafe radar packages installed and that may interfere with deploying air bags with the antenna, processor speed display unit mounted on or in the dash area.

Visibility in the policy vehicle is impaired when the radar antenna, processor or speed display unit with their associated cables, brackets or support system is place din the windshield and dash area. Obviously, potential unsafe vehicle operation exists with reduced operator visibility.

Each vehicle manufacturer and model year create new challenges in mounting or attaching the radar antenna, processor or speed display unit to the police patrol vehicle in a satisfactory and safe manner.

Furthermore, increasingly concerns are being voiced about operator exposure to microwave radiation of such devices when contained within a vehicle.

The present invention is directed to overcoming one or more of the above problems.

SUMMARY OF THE INVENTION

It is the principal object of the invention to provide a new and improved velocity detecting system including a transceiver for directing a beam of energy at a moving object and receiving the reflection of the beam and determining the velocity of the object.

More specifically, it is an object of the invention to provide such a system wherein the user may view displays provided by the system and/or provide input commands to the system while operating a moving vehicle with only an absolute minimum distraction from vehicle operation. It is also an object of the invention to provide such a system that is extremely safe from the standpoint of the operator.

An exemplary embodiment of the invention achieves one or more of the above objects in a structure that includes a means, having a lens, for directing a beam of energy in a desired direction and for receiving a reflected beam, a computer module for controlling the directing means to direct the beam and for processing the reflected beam to provide velocity information, a display module separate from, but connected to, the computer module and including a display face on which the velocity information may be displayed, and an input or control module separate from but connected to the computer module and including functions switches for providing function commands to the computer module to affect the control of the directing means and the information displayed on the display face. According to the invention, the modules are independently mounted at highly efficient, desired locations in a vehicle or the like for maximum viewing efficiency, ease of use, and for operator safety.

In a preferred embodiment, there is further provided a mounting clamp and a universal joint interconnecting the mounting clamp and one of the display and input modules. In a preferred embodiment, there are two such mounting clamps, and two such universal joints, each interconnecting a corresponding one of the display and input modules to the respective mounting clamp.

An exemplary embodiment of the invention contemplates that the universal joint include two spaced ball joints.

In a preferred embodiment, the universal joint includes two spaced socket plates, each having two spaced, generally semi-spherical recesses in one side thereof. The spacing between the recesses in each of the plates is the same and a pair of balls of about the same size or slightly smaller than the recesses are provided. Each ball has a stud extending therefrom. One of the studs is connected to the mounting clamp and the other is connected to the one module being mounted thereby. The balls are sandwiched by the socket plates in respective recesses in each of the plates and means are provided for urging the plates towards each other to frictionally lock the balls in their respective recesses.

In a highly preferred embodiment, the urging means resiliently urges the plates towards each other.

In a highly preferred embodiment, the invention further includes a spotlight having a light source contained within a housing and a lens in the housing. A control wand including an elongated tube on which the housing is pivotally mounted is provided. The directing means is mounted on the housing to be movable therewith and the mounting clamp is clamped to the tube to mount the one module thereto.

In a highly preferred embodiment, the mounting clamp includes a block with a cylindrical opening extending through the block. A slit is located in the block and extends from a side thereof to the opening. A clamping screw is threaded in the block across the slit. The elongated rude of the control wand of the spotlight is located within this cylindrical opening and then the clamping screw tightened to clamp the block thereto.

In still another aspect of the invention, there is provided a velocity detecting radar unit which includes a spotlight unit having a housing with a light source within the housing along with a control wand pivotally mounting the housing for rotation about an axis. The control wand includes an elongated cylindrical tube adapted to extend through the windshield pillar of a vehicle.

A radar antenna is mounted in the housing to be movable therewith and has a radar transmitting and receiving end extending from the housing opposite of the lens. A display module adapted to display velocity data and other information is provided and means adjustably mount the display module to the elongated cylindrical tube at a location thereon remote from the housing. Also provided is an input or control module including function switches for providing function commands to a controller for the unit and means are also provided for adjustably mounting the input module to the tube at a location thereon remote from the housing.

In a preferred embodiment, the housing includes a tubular adapter sleeve in which the antenna is partially received.

The universal mounting means for the radar antenna, display module and the input or control module in the patrol vehicle obviate the need for various bracketry to accommodate different patrol vehicles and model years. The modules of the invention are connected to what is essentially a structural part of the vehicle, thereby greatly enhancing the safety of the installation.

Additionally, the radar system of the invention does not require the vehicle operator to continuously hold any input or control device when operating the radar unit as it is securely attached to the vehicle in a position selected by the vehicle operator. The invention makes it impossible to misplace or lose the input or control device and difficult to subject it to contamination.

Other objects and advantages will become apparent from the following specification taken in connection with the accompanying drawings.

DESCRIPTION OF THE PREFERRED EMBODIMENT

Figure 1:
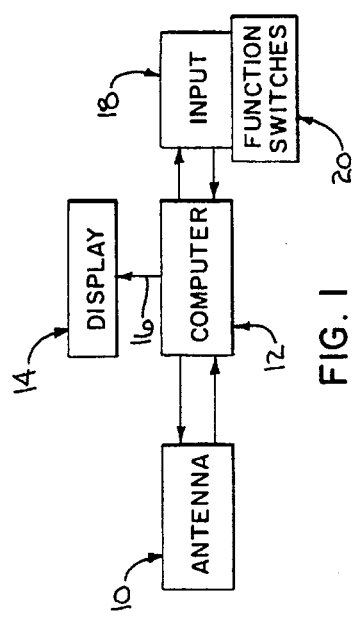
FIG. 1 is block diagram of a velocity detecting system made according to the invention.

Referring to FIG. 1, a velocity detecting system made according to the invention is illustrated in block form. The same will be described herein as a radar based system but it should be understood that the invention may be used with efficacy in other systems as, for example, a laser based system.

The system is made up of four modules. A first of the modules is a transceiver antenna unit, generally designated 10. The same is controlled in a conventional fashion by a conventional computer unit, generally designated 12. The latter provides the antenna unit 10 with control information so that it may generate an appropriate radar beam to be directed at the target whose velocity is to be detected. A reflected beam is received by the antenna 10 and processed thereat in a conventional fashion with information relating thereto returned to the computer 12 which is then operative to compute velocity data.

The system includes a separate display module, generally designated 14. The display module 14 is separate from any of the other units although it is electrically connected as schematically illustrated at 16 to the computer 12. Depending upon the desires of user of the equipment, the display unit may be fabricated to display only target speed and patrol speed. Alternatively, it may be constructed to display both of those quantities as well as a "hold" target speed. Typically, it will additionally provide other information relating to the system as is conventional in the art.

The fourth and final unit is an input or control module, generally designated 18. As is well known, the input to such a system includes a plurality of function switches, generally designated 20, which are part of the input module 18. The function switches are operated to provide appropriate commands to the computer 12. Typically, the input module 18 will include an audio output which may be activated by the computer 12, although that output could be included in the display module 14 if desired.

It is to be particularly understood that except for the antenna unit 10, the remaining components can be fabricated using circuitry and display techniques that are common in the art.

The antenna unit 10 is preferably constructed according to disclosure contained in my co-pending application Ser. No. 07/891,984 and filed May 28, 1992, now U.S. Pat. No. 5,451,970, the details of which are herein incorporated by reference.

Typically, the computer module 12 will be mounted under the hood of the vehicle. That is to say, it will be mounted outside of the passenger compartment of the vehicle to minimize congestion therein and to preclude any possibility of the same becoming loose in the event of an accident involving the vehicle or during maneuvers requiring abrupt changes of direction. The purpose of this is to avoid the computer module from becoming a missile in the passenger compartment during such occasions.

Figure 2:
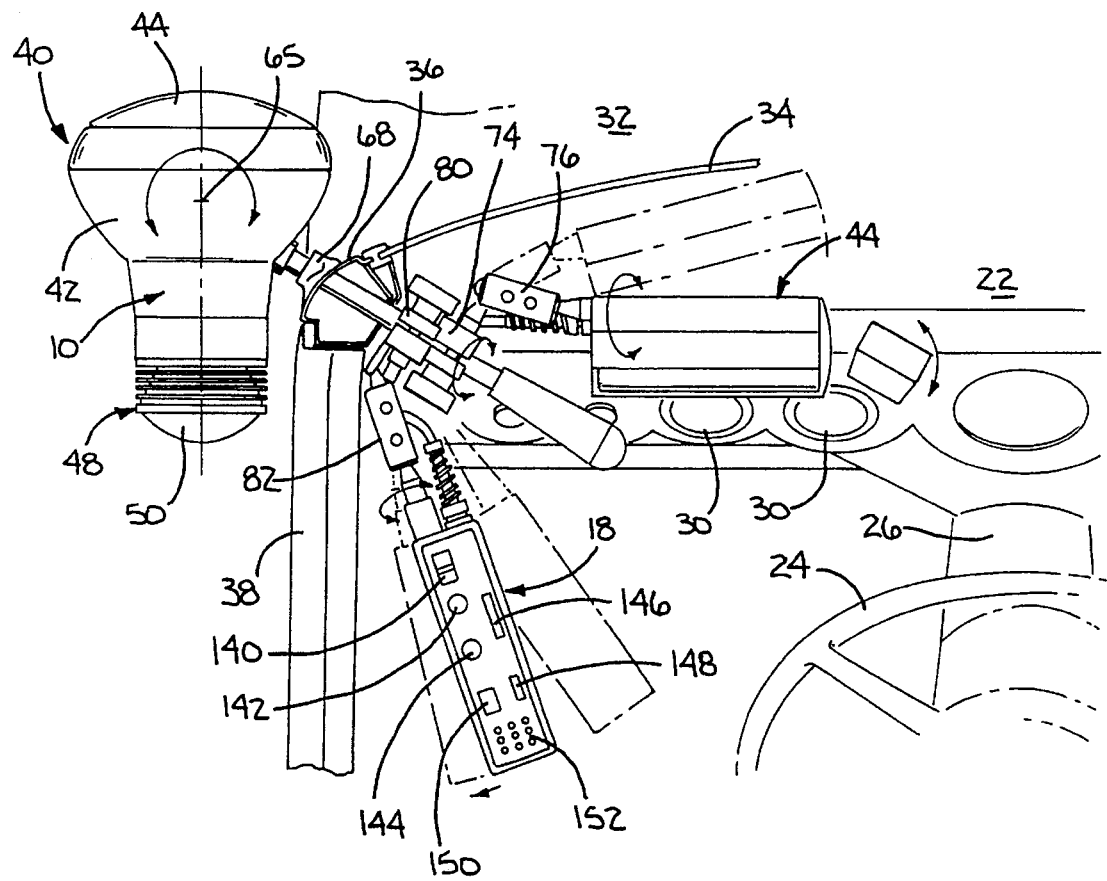
FIG. 2 is a perspective view of the velocity detecting system mounted in a vehicle.
Figure 4:
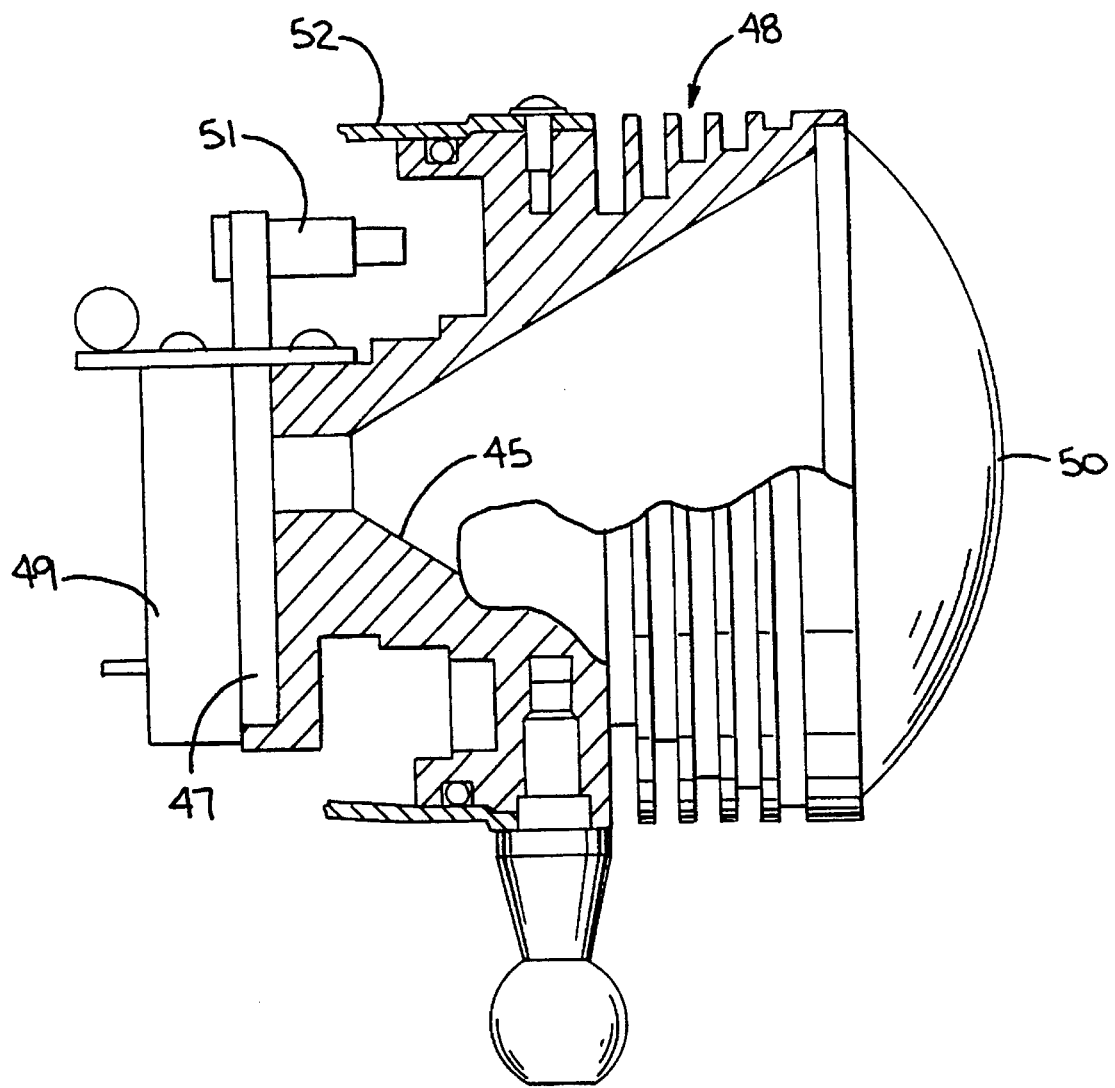
FIG. 4 is a fragmentary, sectional view of a preferred embodiment of an antenna unit employed in the invention.

Turning now to FIG. 2, an exemplary embodiment of the invention as mounted in a vehicle is illustrated. The vehicle dash is shown at 22. The vehicle also includes a steering wheel 24 on a steering column 26 and a variety of conventional vehicle gages 30. The vehicle hood is shown fragmentarily at 32 and extends to a windshield 34. A windshield pillar 36 mounts the windshield 34 and a driver side door 38 is sealed against the pillar 36.

In a preferred embodiment of the invention, the antenna unit 10 includes a spotlight, generally designated 40, having a housing 42 closed at one end by a spotlight lens 44. Within the housing 42 is a lightbulb 46 (FIG. 3) and a reflector 47, which may be in the form of a so-called "sealed beam" light source. The reflector is aimed to direct light emanating from the bulb 46 to the lens 44.

Oppositely of the lens 44, the housing 42 mounts a radar antenna, generally designated 48, which is of the type disclosed in my previously identified application, and which includes a lens 50 that faces oppositely of the lens 44. Internally, the antenna 48 includes a cone shaped chamber 45 opening to the lens 50. At its opposite end, the chamber 45 extends to a groove 47 which, with a plate 49 defines a turnstile cavity. An oscillator 51 is associated with the turnstile cavity 47.

Figure 3:
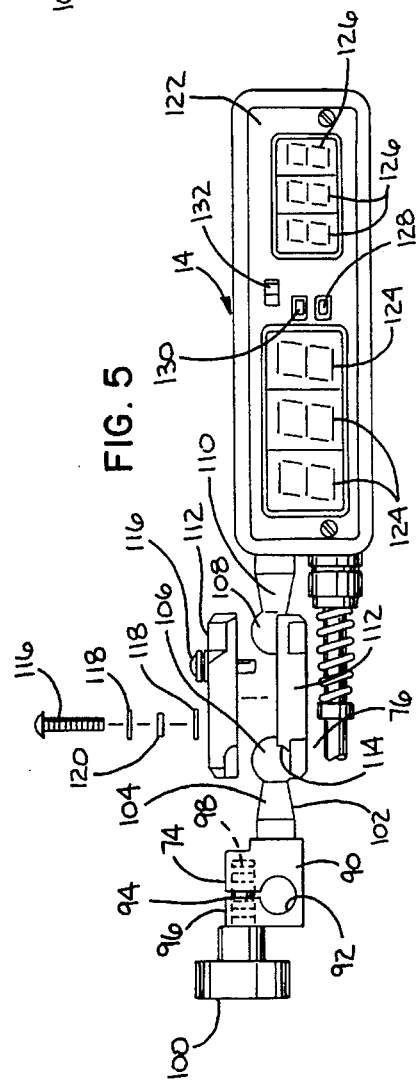
FIG. 3 is an enlarged, fragmentary view of a spotlight and antenna unit used with the invention with parts broken away for clarity.

As seen in FIG. 3, the antenna 48 is partially fitted into a tube like adapter sleeve 52 which fits into an opening 54 formed in the rear of the housing 42. A clamping ring 56 within the housing and securing screws 58 cause an edge of the housing 42 to be sandwiched between the ring 56 and the adapter sleeve 52 to mount the two together. This feature of my invention allows a commercially available spotlight to be retrofitted with the antenna 48 simply by cutting a hole in the rear of the housing 42, fitting the sleeve 52 thereto and then mounting the antenna unit 48 within the sleeve such that the lens 50 and heat radiating fins 60 described in greater detail in my co-pending application are outside of the sleeve 52 to provide good heat dissipation.

As is well known, spotlights of the type illustrated in FIGS. 2 and 3 include a control wand, generally designated 62, which terminates in a gear box 64 adjacent the housing 42. The latter is mounted to the gear box 64 for rotation about an axis shown at 65 in FIG. 2.

The control wand 62 also includes an elongated cylindrical tube 66 which extends through a bracket 68 (FIG. 2) in the windshield pillar 36 into the interior of the vehicle on which the spotlight 40 is mounted. Within the vehicle, the tube 66 extends to a second gear box 68 to which a handle 70 is rotatably mounted.

By conventional mechanical elements known in the art, rotation of the handle 70 about an axis 72 causes the housing 42 to rotate about the axis 65.

In addition, rotation of the handle 70 about the axis of elongation of the tube 66 will cause the housing 42 to rotate about a second axis transverse to the axis 65 as is well known although, the tube 66 itself remains fixed to the vehicle at all times.

Referring to FIG. 2, within the vehicle, the display unit 14 is mounted to the control wand 62, and specifically, the tube 66 by means of a mounting clamp 74. A universal joint 76 extends between the mounting clamp 74 and the display module 14 and allows the same to be mounted within the passenger space of the vehicle in any of the positions illustrated in FIG. 2 and many in addition thereto.

The input module 18 is likewise mounted on the elongated tube 66 by means of a mounting clamp 80 which may be identical to the mounting clamp 74. A universal joint 82, which may be identical to the universal joint 76, interconnects the mounting clamp 80 and the input module 18. Again, the arrangement allows the input module 18 to be mounted in any of the dotted line positions illustrated in FIG. 2 as well as many in addition thereto.

Figure 5:
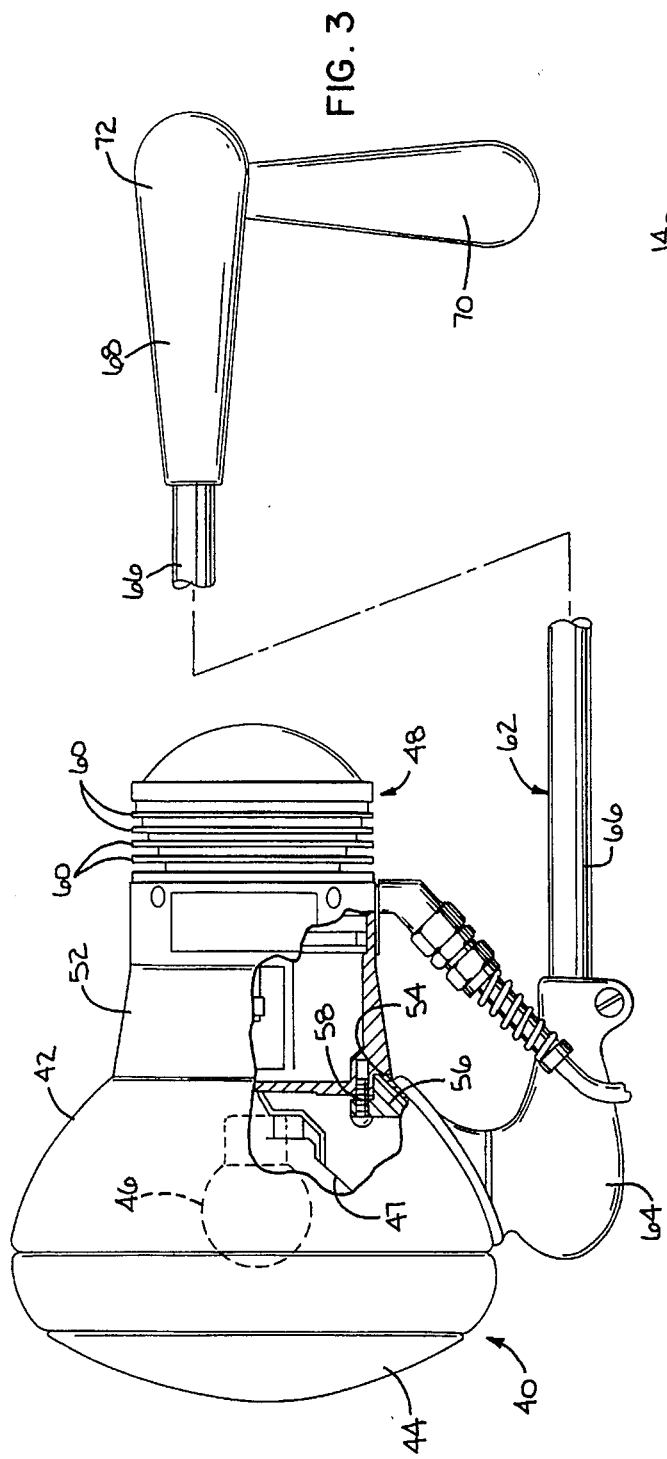
FIG. 5 is an exploded view of a display module, a universal joint and a mounting clamp used in the invention.

Turning now to FIG. 5, the clamps 74 and 80 will be described. Similarly, the universal joint 76 and 82 will be described. Since the mounting clamp 74 and 80 as well as the universal joints 76 and 82 are identical one to the other, only the mounting clamp 74 and the universal joint 76 will be described in detail.

The mounting clamp 74 is made up of a generally rectangular solid block 90 of metal. The same includes a cylindrical through bore 92 of a diameter just slightly greater than the outside diameter of the tube 66. A slit 94 extends from one side 96 of the block 90 to the cylindrical opening 92 and a screw 98 threaded into the block 90 so as to extend across the slit 94. An operating knob 100 is firmly affixed to one end of the screw 92. As a consequence of this construction, it will be appreciated that the size of the opening 92 can be constricted thereby causing block 90 to be firmly clamped to tube 96. At the same time, the clamp 74 can be rapidly and readily released simply by a twist of the knob 100.

A stud 102 extends from the block and includes a frusto conical section 104 extending to a ball 106. A similar ball 108 and stud 110 extend from the display module 14.

Balls 106 and 108, together with two identical socket plates 112 form the universal joint 76. The socket plates 112 include semispherical spaced recesses 114 (only one of which is shown). The recesses 114 are of the same or of slightly larger diameter than the balls 106 and 108 and the recesses in one of the plates 112 are spaced the same distance as the recesses in the other.

The plates 112 are brought into sandwiching relation with the balls 106, 108 with the latter being in respective ones of the recesses 114 in each of the two plates 112. A pair of clamp screws 116 secure two plates 112 together so that they tightly frictionally engage the balls 106 and 108, preventing them from moving under normal circumstances but allowing them to shift within their recesses when an adjusting force is applied thereto. To facilitate this, the plates 112 are resiliently urged toward one another. Specifically, a pair of washers 118 sandwich elastomeric O-ring 120. When the screws 116 are tightened, there being two such screws, respective O-rings 120 are compressed and exert a resilient force to urge the plates 112 towards each other.

FIG. 5 also illustrates the display face 122 of the display unit 14. Conventional decimal display units 124 are utilized to indicate target speed while similar but smaller display units 126 may be used to indicate patrol speed. An LED 128 may be used to indicate low voltage while an LED 130 can illustrate the use of the RFI function. A switch 132 may be utilized to select the illumination of the face 122 and brightness of the segment display elements between bright and dim.

Similarly, the input module 18 may be seen in greater detail in FIG. 2. A function switch 140 may be utilized to select one of two different antennas to be connected to the system for display while a switch 142 may be utilized to release the display of a locked on velocity. A switch 144 may be utilized to generate a test function. A thumb switch 146 can be used to control the volume of an audio output. A squelch control switch 148 is illustrated as is a mode selection switch 150 which may switch the unit between the patrol mode and the stationary mode. Finally, an audio speaker unit 152 may be incorporated in the input module 18.

From the foregoing, it will be appreciated that a velocity detecting unit made according to the invention provides a number of advantages over those heretofore known. For one, it enables the radar antenna 48 to be mounted exteriorally of the vehicle so as to minimize the radiation to which the operator is subjected.

Furthermore, it advantageously makes use of the control wand conventionally used for aiming the spotlight 40 with which patrol vehicles are customarily equipped to allow positioning of the antenna 48 and its resultant beam from the interior of the vehicle as well as for its normal function of aiming the spotlight 40.

In this regard, the fact that knobs 100 may be operated easily to quickly release the connection between the display unit 14 and the input and control unit 18 on the one hand and the control wand 62 on the other, thereby permitting the display 14 to be radially and axially positioned for best viewing. In a similar manner, the input and control unit 18 may be positioned for the most convenient location for each individual operator.

Use of the independently mounted and separate units for the display and input functions allows mounting of the computer at an under the hood location which is safe and will not pose any danger to the operator of the system in abrupt maneuvering or the like. Similarly, the mounting of the display unit 14 and the input unit 18 to the spotlight 40 and its control 162 positively assures that they will remain in place during abrupt maneuvers or the like.

Even more importantly, the unique mounting including the universal joints allow both the display module 14 and the input module 18 to be individually and easily located within the vehicle such that operation or viewing of the system takes an absolute minimum of time and space, thereby substantially lessening the distraction to the operator, particularly when the vehicle is in motion. In this regard, the display unit 14 can be located in substantial direct alignment with the steering wheel 24 so that all the operator has to do is slightly shift his eyes from the road in front of him to the display unit, rather than actually turn his head as with prior art units. Similarly, the location of the input unit 18 allows the same to be operated by the operator of the vehicle with no more distraction than the use of a turn signal.

And importantly, all of this can be accomplished using the invention without any interference with, for example, a steering post or dash mounted air bag safety device or the like.

Further, the universal design aspects of the new radar system consisting of the antenna, the support systems, the display 14 and the input and control unit 18 permit the new radar system to be readily installed in various manufacturers' model vehicles and model years. Obviously, the new radar system may also be integrated into newly designed and manufactured vehicles.

Still further, the new radar system encourages safe and recommended 'two hands on the steering wheel' vehicle operation as it is not necessary to hold a portion of a radar operating system such as a hand remote control device.

Thus, velocity detecting system made according to the invention achieves the objects set forth previously.

I claim:

1. A radar antenna for a radar transmitting and receiving unit used to monitor the speed of a wheeled vehicle comprising:

a body of metallic material defining a cone shaped chamber, said chamber having a wide end open to one end of the exterior of said body and a narrow end opening to a turnstile cavity;

an oscillator mounted on said body adjacent said narrow end and in operable relation with said cavity; and a spotlight housing including a pair of openings with a spotlight lens disposed in one of said openings and a spotlight within said housing, said spotlight housing mounting and surrounding at least part of said body to contain said oscillator while leaving said one end extending from said body through the other of said openings.

2. The radar antenna of claim 1 further including a further lens, said further lens being mounted to close said wide end.

\* \* \* \* \*